United States Patent [19]
Batson et al.

[11] Patent Number: 4,765,798
[45] Date of Patent: Aug. 23, 1988

[54] METHOD OF ADDING ELECTROLYTE TO ELECTROCHEMICAL CELLS

[75] Inventors: David C. Batson, Amesbury; Ronald E. Barth, Chelmsford; Franz Goebel, Sudbury; Peter B. Harris, Stow, all of Mass.

[73] Assignee: GTE Government Systems Corporation, Waltham, Mass.

[21] Appl. No.: 110,751

[22] Filed: Oct. 20, 1987

[51] Int. Cl.⁴ .................. H01M 6/00; H01M 10/50
[52] U.S. Cl. ............................ 29/623.1; 429/120; 29/623.5
[58] Field of Search .................. 29/623.1, 623.5; 429/51, 52, 120

[56] References Cited

U.S. PATENT DOCUMENTS

| | | | |
|---|---|---|---|
| 3,997,366 | 12/1976 | Davis | 429/251 |
| 4,006,034 | 2/1977 | Shimotake et al. | 29/623.5 |
| 4,294,005 | 10/1981 | Brennan | 29/623.5 |
| 4,471,963 | 9/1984 | Airhart | 277/134 X |
| 4,476,204 | 10/1984 | Auborn | 429/196 |

Primary Examiner—Brian E. Hearn
Assistant Examiner—Stephen J. Kalafut
Attorney, Agent, or Firm—J. Stephen Yeo

[57] ABSTRACT

A liquid electrolyte solution is added to porous components of an electrochemical cell prior to assembly. The electrolyte solution is frozen and all the components are assembled into a sealed cell. The electrolyte solution is then allowed to melt.

6 Claims, 1 Drawing Sheet

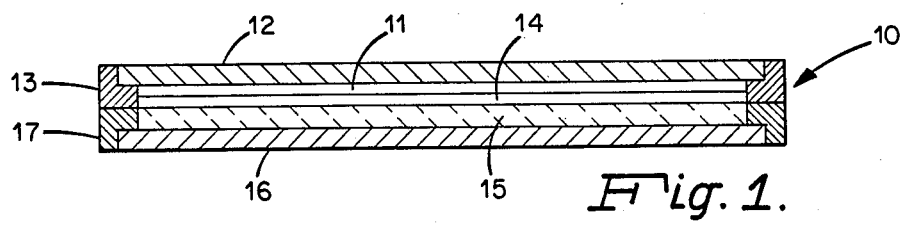
Fig. 1.
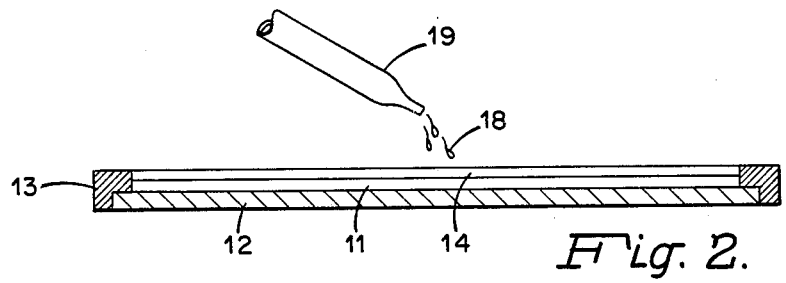
Fig. 2.
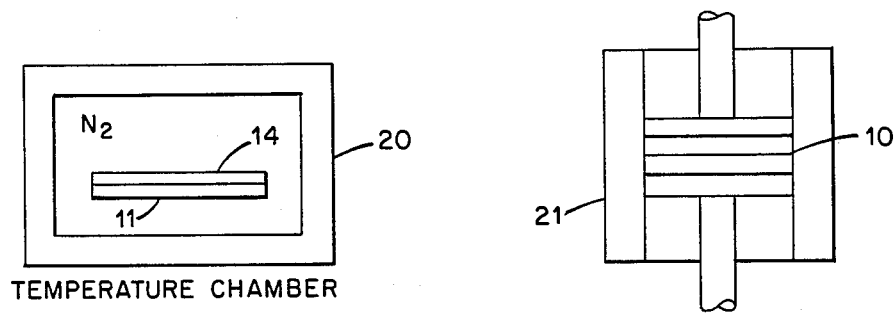
TEMPERATURE CHAMBER
Fig. 3.
COOLING FIXTURE
Fig. 4.
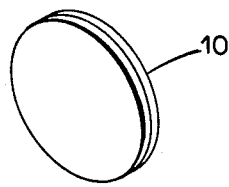
Fig. 5.

METHOD OF ADDING ELECTROLYTE TO ELECTROCHEMICAL CELLS

The United States Government has rights to this invention under Contract F33615-86-C-2677.

RELATED COPENDING APPLICATION

Copending U.S. patent application Ser. No. 07/110,410, for "Modular Electrochemical Battery", by Goebel et al., filed simultaneously with and assigned to the same assignee as the present application, describes a battery which can be manufactured according to the method described hereinafter.

BACKGROUND OF THE INVENTION

This invention is concerned with electrochemical cells and batteries, and more particularly, it pertains to methods of fabricating electrochemical cells and batteries.

An electrochemical cell may be either a reserve type or an active type. In a reserve cell, electrolyte is stored in a container apart from the electrode until use. An active cell, however, is made with the electrolyte already in contact with the electrodes. If the electrolyte is a liquid, spillage during assembly can be a problem. If the physical design permits, the electrolyte can be added after assembly of the other components. For example, Goebel in U.S. Pat. No. 4,517,736 describes adding a liquid cell component through a filling port which is later sealed. In some cells, such a filling port is not practical. In batteries wherein individual cells are isolated from each other, a single filling port is not practical without a valve arrangement.

It is desirable to provide an improved method of adding a liquid electrolyte to cell and batteries during assembly.

SUMMARY OF THE INVENTION

Briefly, according to one aspect of the invention, there is provided a method of adding liquid electrolyte solution to an electrochemical cell having a porous component. The porous component is wetted with the electrolyte solution, which is then frozen. The components of the cell are assembled and the cell is sealed. The electrolyte solution is then allowed to melt.

BRIEF DESCRIPTION OF THE DRAWINGS

FIG. 1 is a schematic cross sectional representation of an electrochemical cell to which the method of the invention may be utilized;

FIG. 2 shows electrolyte solution being added to porous elements of the cell;

FIG. 3 illustrates the electrolyte solution being frozen;

FIG. 4 pictures the cell components being assembled; and

FIG. 5 is a visualization of the finished cell.

DETAILED DESCRIPTION OF THE DRAWING

The invention is a method of adding liquid electrolyte to electrochemical cells during their manufacture. To illustrate the method, a schematic cross sectional representation of a cell 10 is given in FIG. 1. To practice the invention one or more elements of cell 10 must be porous, that is, capable of absorbing liquid electrolyte. The specified structure of the cell is not otherwise critical to the invention. In the particular cell illustrated, the porous elements may be a porous carbon cathode current collector 11 on a first carrier plate 12 (also called a substrate) held by a first frame 13, and a porous separator 14, preferably made of glass paper.

The anode 15 may be a sheet of metalic lithium on a second carrier plate 16, held by a second frame 17.

Referring to FIG. 2, the porous elements of the cell, i.e., the porous carbon cathode current collector 11 and porous glass separator 14, are wetted to saturation with electrolyte solution 18 in a moisture free atmosphere prior to assembly. The electrolyte solution may be, for example, lithium tetrachloraluminate dissolved in thionyl chloride. A dispenser 19 may be used to wet the porous elements 11, and 14. Alternately, the elements may be sprayed with or dipped into electrolyte solution.

As a feature of the invention the electrolyte solution carried by the porous elements is frozen. This step is illustrated by FIG. 3 which shows the wetted elements 11, and 14 being cooled to below the electrolyte freezing point by liquid nitrogen in temperature chamber 20 or other cooling means. The frozen electrolyte bonds carbon cathode current collector 11, porous separator 14, and carrier plate 12 together.

The elements of the cell are then assembled and the cell sealed, while the electrolyte remains frozen. As seen in FIG. 4, a cooling fixture 21, which may contain liquid nitrogen, may be used during assembly to prevent melting.

After the cell is assembled and sealed as seen in FIG. 5, the temperature of the cell is allowed to rise until the electrolyte is melted.

This method may be used in the manufacture of single cells or a battery of cells. The practice of invention allows electrolyte solution to be added to cells without the possibility of spilling of corrosive liquid electrolyte regardless of orientation of the cell's elements during assembly.

Variations upon the described method will now be apparent to those skilled in the art. For example, dry ice may be used to freeze the electrolyte. Accordingly the scope invention is not to be limited in the specific example given, but by the breadth of the claims.

What is claimed is:

1. A method of adding liquid electrolyte solution to an electrochemical cell during assembly comprising the steps of:
    (a) providing one or more porous cell components;
    (b) wetting said porous cell components with a liquid electrolyte;
    (c) freezing said electrolyte;
    (d) assembling said porous cell components with other cell components into a cell; and
    (e) allowing said electrolyte to unfreeze.

2. The method of claim 1 wherein said porous cell components are a carbon cathode current collector and a glass paper separator.

3. The method of claim 2 where said liquid electrolyte solution includes lithium tetrachloraluminate and thionyl chloride.

4. The method of claim 1 which comprises the additional step of maintaining said cell components at a below the freezing point of said electrolyte during assembly.

5. The method of claim 4 wherein said porous cell components are a carbon cathode current collector and a glass paper separator.

6. The method of claim 5 where said liquid electrolyte solution includes lithium tetrachloraluminate and thionyl chloride.

* * * * *